William R. Van der Veer
Walter A. Gunkel
INVENTORS

ATTORNEYS

William R. Van der Veer
Walter A. Gunkel
INVENTORS

United States Patent Office 3,437,917
Patented Apr. 8, 1969

3,437,917
METHOD OF AND APPARATUS FOR HIGH SPEED MAGNETIC INSPECTION OF TUBULAR GOODS
Walter A. Gunkel and William R. Van der Veer, San Antonio, Tex., assignors to Southwest Research Institute, San Antonio, Tex.
Filed Dec. 13, 1966, Ser. No. 601,399
Int. Cl. G01r 33/12
U.S. Cl. 324—37          10 Claims

ABSTRACT OF THE DISCLOSURE

A method and apparatus for detecting flaws in tubular ferromagnetic members is disclosed which includes a magnetizing means, such as a pair of spaced apart coaxial coils mounted about the surface of the member, for establishing a longitudinal magnetic field of substantially constant flux density along at least a portion of the tubular member. A sensing unit including a mechanical support element having an electrical signal generating device fixed thereon is rotated at high speeds, for example, 1800 r.p.m., in close proximity to but spaced from and out of contact with the outer surface of the tubular member. A flaw in the member will cause a variation in the density of magnetic flux along the member and this variation will generate an electrical signal in the probe indicative of the presence of a flaw; means are included for determining the relative magnitude of this signal, and if desired, an alarm or a marker may be activated when the magnitude of this signal exceeds a predetermined level.

---

This invention relates to non-destructive magnetic inspection, and more particularly to a novel method and apparatus for high-speed magnetic detection of flaws in ferromagnetic tubular goods.

Tubular goods used in gas distribution lines are often formed from skelp which is bent into generally cylindrical form and the butting edges welded together. Defects may be present in the parent metal or in the weld itself and it is essential that such tubular goods be tested to detect any defects prior to being placed in service. Inspection may be performed at the mill producing the tubular goods or later at a station just prior to placing new or used tubular goods into service. In either event, it is highly desirable that the inspection be performed as rapidly as possible and that the handling of the pipe be kept to a minimum. The inspection must include the full wall thickness of the pipe to make certain that defects on the inner surface or within the metal, as well as any external defects, are detected.

Since the inspection may take place at a station just prior to putting the pipe into service and the pipe may at such time be primed, enameled, wrapped or rusty, it is desirable that the inspection system be capable of full inspection without regard to external condition or coatings. Moreover, it is desirable that the inspection be performed without regard to weld orientation and that the inspection cover both the weld and the parent metal.

One method found useful in nondestructive inspection of tubular goods has been magnetic inspection and numerous systems for various types of magnetic inspection have been used. Some of such systems are directed primarily to the weld and, in such case, require proper orientation of the weld and may not detect flaws in the parent metal. Other magnetic systems develop a circumferential magnetic field about the tubular goods. In such case, it is usually necessary to have an electrode in the pipe and placement of such electrode is time consuming. Other magnetic inspection systems require rotation of the pipe during inspection, physical contact between the inspection probe and the member being tested, fail to make a full 100% inspection of the pipe, do not take cognizance of all types of defects, require smooth surfaces or have other objectionable features.

Accordingly, it is an object of the present invention to provide an improved high-speed non-destructive magnetic inspection of tubular goods which makes a full inspection of both parent metal and the weld without requiring weld orientation, rotation of the member or physical contact between the sensing member and the pipe.

It is another object to provide an improved full non-destructive magnetic inspection of both the weld and parent metal of tubular goods which can be performed at a high rate of speed.

It is another object to provide an improved high-speed nondestructive magnetic inspection of tubular goods which can be successfully conducted without regard to external conditions or coating of the members being inspected.

It is a further object to provide a high-speed non-destructive magnetic inspection of tubular goods which can be performed without the inspection apparatus being in physical contact with the pipe and without having to rotate the pipe or place an electrode therein.

In order to accomplish the above objects and other objects which will be more apparent from the detailed description which is about to follow, the method of the present invention is comprised of producing a magnetic field in two spaced coils, rectilinearly passing the tubular goods through the coils thereby establishing between the coils a longitudinal magnetic field about the tubular member, rotating a sensing unit including a mechanical support element having an electrical signal generating device fixed thereon at high speed in the longitudinal magnetic field. Any discontinuity in the longitudinal magnetic field will generate a signal in the device. Since the rotating sensing unit scans the entire pipe, it is only necessary to longitudinally move the tubular goods relative to the spaced coils and it is not necessary to rotate the pipe.

In a preferred embodiment described in the detailed description, the pipe is moved relative to the coils and the scanner. However, if desired, the inspection device can be moved relative to stationarily-located tubular goods. The relative longitudinal movement may be timed to the rotational speed of the sensing unit so that there is a full 100% inspection of the tubular goods being tested. The signal generated by the signal generating device is compared with a signal having a predetermined level and any time the generated signal exceeds the predetermined level an alarm system is energized. If desired, a marking system may also be energized to mark the location of the defect. With such a method it has been found possible to economically make a full 100% inspection of tubular goods.

One form of apparatus which may be utilized to practice such above-described method is simple in design, rugged in construction and suitable for either mill or field inspection. The system is comprised generally of a pair of spaced, coaxially aligned, circumferentially wound, D.C. energized, coils establishing a magnetic field, a pipe conveying system which moves the pipe through the coils establinhing a longitudinal magnetic field. A sensing unit including a tubular rotor is mounted between the coils for rotation about the axis of the tubular member being inspected. An electrical signal generating device is mounted on the tubular rotor to scan the longitudinal magnetic field. Any discontinuity in the magnetic field will generate a signal in the device. An amplifier is provided on the rotor to amplify the signal generated by the device and means are provided to recover the generated amplified siggnal from the tubular rotor. The generated signal is fed into an electronic system where it is further amplified and then compared with a signal of a predetermined level. Upon the generated signal exceeding the predetermined level an alarm system and/or marking system is energized. It has been found the signal-to-noise ratio is particularly good at high-speed rotation of the sensing unit; therefore, the apparatus lends itself to high-speed testing of pipe.

The features of our invention which we believe to be novel are set forth with particularity in the appended claims. The invention itself, however, both as to organization and method of operation together with further objects and advantages thereof may best be understood by reference to the following detailed description taken in conjunction with the accompanying drawing in which:

FIG. 4 is a block diagram of the electrical components for the system shown in FIG. 1;

Figure 1:
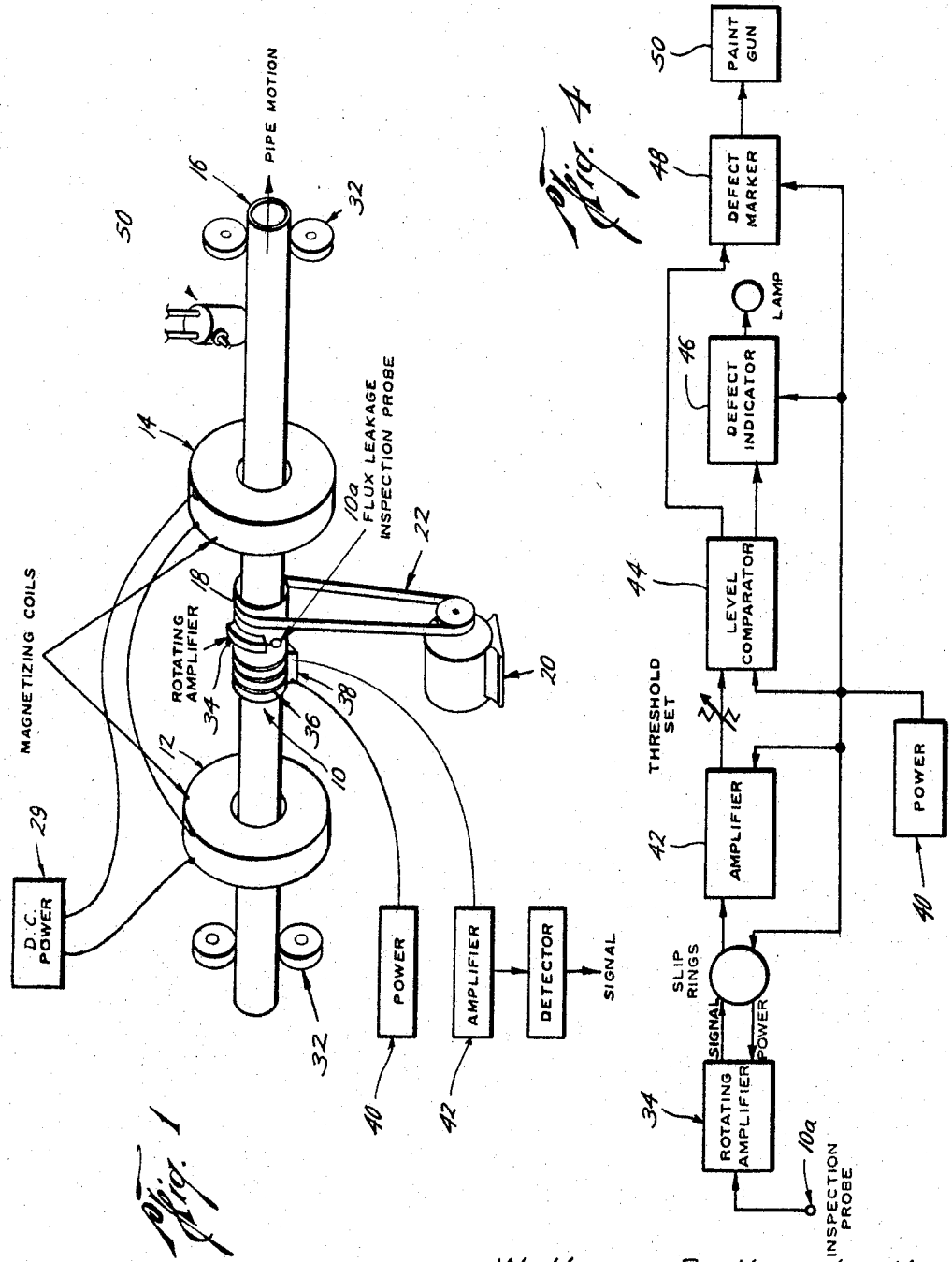
FIG. 1 is a schematic of the magnetic inspection system of the present invention.

Referring now to FIG. 1, it can be seen that the magnetic inspection system of the present invention is comprised generally of flux leakage inspection or sensing unit 10 which scans a longitudinal magnetic field produced by an energized pair of spaced, coaxially-aligned coils 12 and 14 and a rectilinearly moving tubular member or pipe 16. The sensing unit 10 includes a mechanical support element 18 which in the embodiment shown is a tubular rotor or rotating sleeve and an electrical signal generating device 10a mounted on support element 18. Device 10a may be a coil or other suitable means for generating an electrical signal in response to a magnetic flux.

One difficulty with former magnetic inspection systems has been that the inspection probe has to actually be in contact with the surface of the pipe being inspected. Therefore, if the pipe is coated, wrapped or has been subjected to atmospheric conditionn and is corroded, the results obtainable are not always reliable and, unless a smooth surface is provided, the wear on the inspection probe is very high. Accordingly, it was considered most desirable to eliminate physical contact between the inspection probe and the member being tested.

The flux fields from various types of magnetization were investigated. It was found that if the magnetizing coils had their turns extending circumferentially the flux flow would be toroidal in form and in the direction to flow longitudinally inside the walls of the pipe. The density of flux within the pipe in much greater than it is in the air. In fact, it is possible to obtain a condition of almost total magnetic saturation of the pipe wall. In addition to having flux lines flowing completely around each coil, it was found that when two spaced coaxial coils are energized there is some flow flux-wise which links both coils and flows through the pipe in the area between the coils. Although the magnetization between the coils is less than under each coil, it was determined that the magnetization between the coil—i.e., the longitudinal magnetic field—is useable. It has been found that with a six-inch spacing of the coils it is possible to obtain flux densities on the order of 8000 gauss in the region between the coils and this represents a value sufficient for magnetic inspection.

Figure 2:
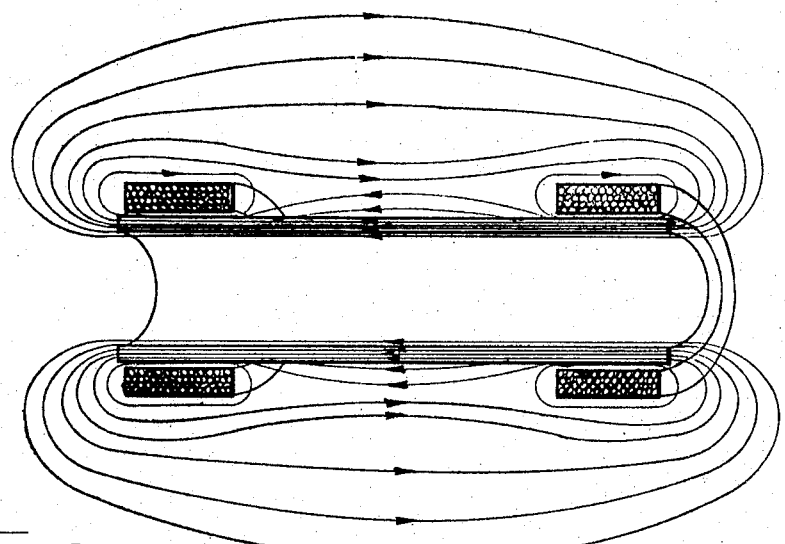
FIG. 2 is a schematic view of the flux pattern produced by energizing a pair of coaxially spaced coils and introducing a homogeneous section of pipe through the axis thereof.

As can be seen from an examination of the flux pattern shown in FIG. 2, if the section of pipe between the two coils is homogeneous the flux pattern will be free of anomalies or bumps. However, as can be seen from the flux pattern illustrated in FIG. 3, if the section of pipe between the two coils has a defect or there is non-homogeneous area, there is a local change in flux density. As can be seen, the anomaly in the flux pattern is present some distance from the wall of the pipe.

Figure 3:
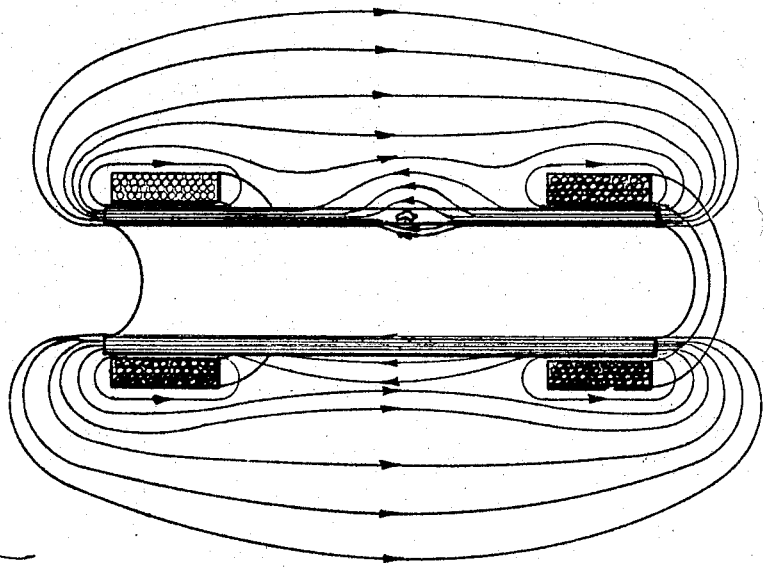
FIG. 3 is a view similar to FIG. 2 of the flux pattern from a pipe having a defect or inhomogeneous area.

The rotating flux leakage electrical signal generating device 10a is, in effect, an electrical conductor and, as such, will produce a voltage according to the flux density of the magnetic field through which it passes. Since device 10a is rotated around the tubular member or pipe 16 at a constant distance from the surface of the pipe, the flux density encountered by device 10a when it is rotated through a longitudinal magnetic field represented by a homogeneous section of pipe, as shown in FIG. 2, will be constant and no voltage or signal will be produced. However, if the sensing unit 10 is rotated in a field in which there is local variations, as is shown in FIG. 3, there will be changes in flux density and when device 10a passes through such variations a voltage or signal will be generated.

The addition of iron end pieces and connecting straps decreases the reluctance of the magnetic path around the magnetizing coils and through the pipe. Such a construction provides a high-permeability path around the complete magnetic circuit except for a small radial gap around the pipe in the end piece which is necessary to provide clearance for the pipe. The result of lowering the reluctance of the total path is to increase the flux density in the pipe for a given magnetizing force.

Figure 5:
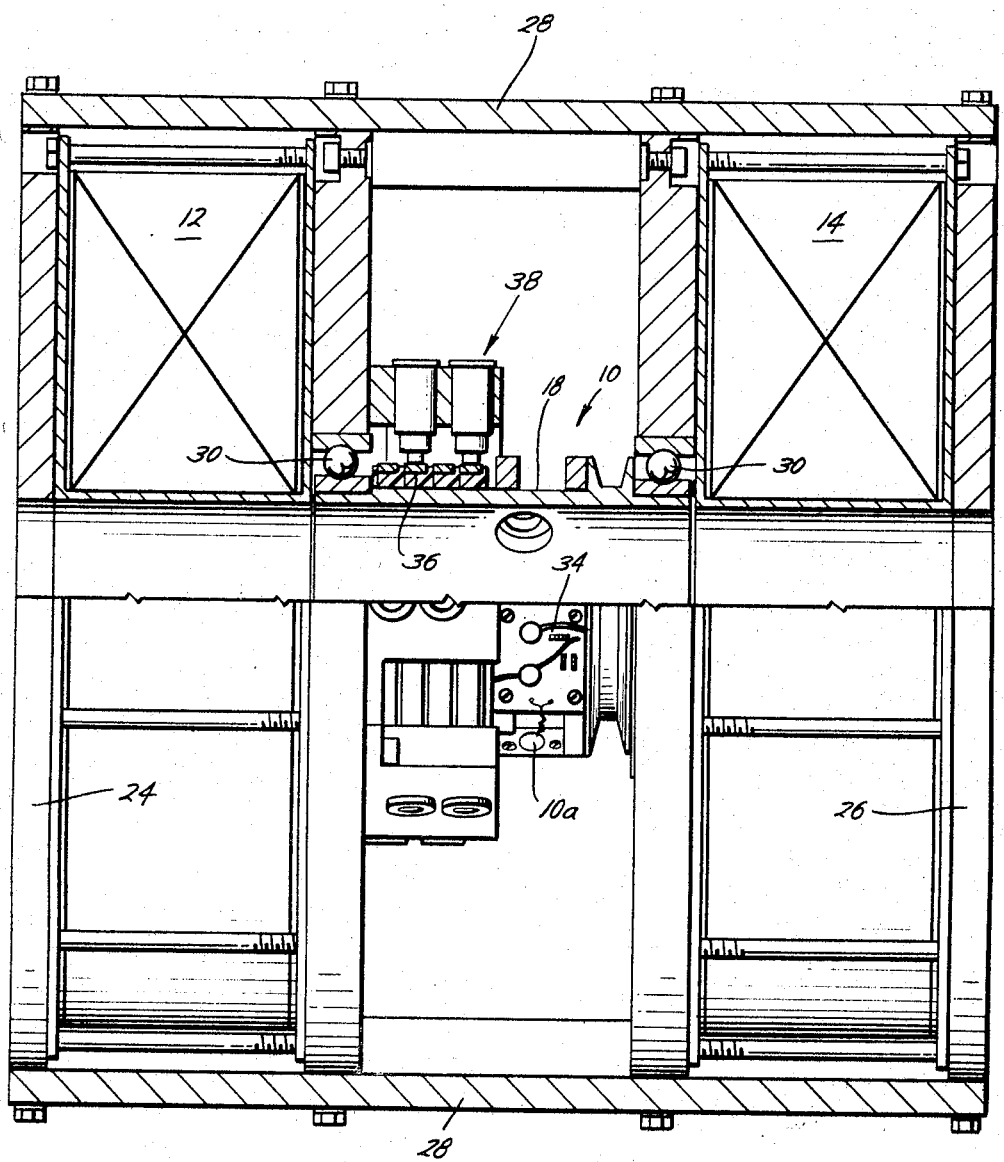
FIG. 5 is a view partially in elevation of the coil and rotary sensing unit of the inspection device.

Referring now to FIGS. 1 and 5, it can be seen that the flux leakage electrical signal generating device 10a is mounted on a sleeve 18 which is rotatively driven about the pipe 16 by a motor 20 through a drive belt 22. As can be more clearly seen from FIG. 5, the two magnetizing coils 12 and 14 are positioned fairly close together and are provided with iron end pieces 24 and 26 and a plurality of longitudinally extending straps 28. The rotating sleeve 18 is journalled in bearings 30 located in the assembly. Accordingly, the two magnetizing coils 12 and 14 and the rotating sleeve 18 are all coaxial. The magnetizing coils 12 and 14 are connected in series to a source of D.C. power 29 to induce a magnetic flux flow through the pipe 16. By having the iron end pieces 24 and 26 and the longitudinally extending straps 28, a high-permeability path around the complete magnetic circuit is provided which increases the flux flow through the pipe for a given magnetizing force. As can be seen from FIG. 1, the central opening through the magnetizing coils 12 and 14 and the rotating sleeve 18 is such that there is no physical contact between the longitudinally moving pipe 16 and magnetizing coils 12 and 14 and the flux leakage electrical signal generating device 10a which is mounted on the rotating sleeve 18. The longitudinal movement for the pipe is provided by pipe drive wheels 32 which may be of any conventional construction to move pipe along a longitudinal axis. Pipe-conveying means are well known to those skilled in the art.

As mentioned, electrical signal generating device 10a is an electrical conductor and will produce a signal when it passes through any variation in the flux density field. However, the signal will be very weak. In order to provide a more useable signal, the rotating sleeve 18 is provided with a transistorized amplifier 34 which receives the signal generated by the sensing unit 10 and amplifies it. To provide power for the rotating amplifier 34 and to recover the signals generated by the amplifier 34, the rotating sleeve 18 is also provided with slip rings 36 which are electrically connected to the amplifier 34. A set of stationary brushes 38 attached to the assembly cooperates with the slip rings 36 to deliver power from an external source 40 to the amplifier 34. The stationary brushes 38 also deliver the signal generated by the amplifer 34 to the remaining electronic component in the system.

It has been found that, all other things being equal, by having a rotating flux leakage electrical signal generating device the faster the inspection is performed the better the defect signals. The size of flux leakage inspection coil and the rotative speed determine resolution. In a test situation, the sleeve 18 containing a flux leakage inspection coil having a diameter of approximately ¼″ was rotated at a speed of 1800 r.p.m. with the pipe moving at a rate of 80 linear feet per minute. With such an arrangement, the helical path traversed by device 10a fully covered the entire circumferential area of the pipe 16. Since the speed determines the signal-to-noise ratio, a very low noise level resulted. Accordingly, a high-speed spinning flux leakage electrical signal generating device scanning a longitudinal magnetic field is a desirable high-speed defect detection device. It was also found that device 10a rotating at such speed satisfactorily detected pinhole defects, with defects on both the inner and outer wall of the pipe being detected.

As can be seen from FIG. 4, the signal from the rotating amplifier 34 is fed into a second amplifier 42 to provide further amplification. When the signal reaches a predetermined magnitude it can pass a threshold set and through a level comparator 44 which will energize a defect indicator 46 and/or a defect marker 48. A paint gun 50 may be attached to the defect marker 48 to mark the location of the defect.

Accordingly, it can be seen that the present invention provides a high-speed method for determining flaws in tubular goods. With such method, it is only necessary to longitudinally move the pipe through the magnetizing coils. It is not necessary for the sensing unit to come into physical contact with the pipe being inspected and, therefore, the fact that the pipe may be provided with external coatings or have a rough surface will not affect the results obtained nor result in undue wear on the inspection device. It has been found that the signal-to-noise ratio on high-speed inspection is very satisfactory and that a full 100% rapid inspection of tubular goods can be accomplished. A preferred embodiment of the inspection apparatus is simple and rugged in construction.

The invention having been described, what is claimed is:

1. A method for the detection of flaws in a tubular ferromagnetic member comprising the steps of: establishing a longitudinal magnetic field along at least a portion of the tubular member, said magnetic field including flux lines cutting through the wall of such member and running substantially parallel to the longitudinal axis of such member, and having substantially constant magnetic flux density adjacent the wall of said member in the absence of flaws; rotating a sensing unit including a mechanical support element having an electrical signal generating device fixed thereon at relatively high speed about said portion while maintaining said sensing unit, mechanical support unit and device in close proximity to but spaced from and out of contact with said outer surface to permit said high speed rotation, whereby an electrical signal indicating the presence of a flaw is generated in said device in response to variations in the magnetic flux about such portion caused by flaws in the surface of such portion; and determining the relative magnitude of the electrical signal.

2. The method of claim 1 wherein said relatively high speed is in the order of 1800 r.p.m.

3. The method of claim 1 further including the steps of comparing said generated electrical signal with a signal of predetermined level and energizing an alarm when the magntiude of said generated signal exceeds the magnitude of the signal of predetermined signal.

4. The method of claim 1 further including the step of moving the tubular member along its longitudinal axis so that the entire length of the member may be inspected.

5. An apparatus for detecting flaws in tubular ferromagnetic members, comprising, in combination: magnetizing means encircling said member along the length thereof and generating a longitudinal magnetic field of substantially constant flux density in the absence of flaws along the wall of said member; means for moving said tubular member along its longitudinal axis through said magnetizing means; a tubular rotor mounted adjacent the magnetizing means and spaced about and out of contact with said tubular member so that said rotor is capable of being rotated about the longitudinal axis of said member at relatively high speeds; an electrical signal generating device mounted on said rotor relatively close to the outer surface of said member whereby electrical signals indicating the presence of flaws are generated in said device in response to variation in the magnetic flux about said member caused by flaws in the surface of said member; means for rotating said rotor and electrical signal generating device at relatively high speeds; and means for determining the magnitude of said electrical signal.

6. The apparatus of claim 5 wherein said rotating means rotate said rotor at about 1800 r.p.m.

7. The apparatus of claim 5 wherein said magnetizing means includes two spaced apart coaxial coils including pole pieces located at the outer ends of each coaxial coil, and a plurality of longitudinally extending straps connecting said pole pieces and coils together to increase the flux flow through the tubular member for a given magnetizing force.

8. The apparatus of claim 5 wherein said determining means includes means transmitting said electrical signal from said rotating device to stationary peripheral equipment capable of determining the relative magnitude thereof.

9. The apparatus of claim 8 wherein said transmitting means includes a set of slip rings on said rotor electrically connected to said device and a set of corresponding stationary brushes in contact with said slip rings and electrically connected to said stationary peripheral equipment.

10. The apparatus of claim 5 further including means for generating an electrical signal of predetermined level, and means for comparing the electrical signal from said electrical signal generating device with said predetermined electrical signal.

References Cited

UNITED STATES PATENTS

| | | | |
|---|---|---|---|
| 1,992,100 | 2/1935 | Stein | 324—37 |
| 2,308,159 | 1/1943 | Drummond et al. | 324—37 |
| 2,998,566 | 8/1961 | Cochran | 324—37 |
| 3,066,254 | 11/1962 | Price et al. | 324—37 |
| 3,068,380 | 12/1962 | Lamoreaux | 324—34 X |
| 3,271,664 | 9/1966 | Mountz et al. | 324—40 |
| 3,278,839 | 10/1966 | Wells et al. | 324—40 |

RUDOLPH V. ROLINEC, *Primary Examiner.*

A. E. SMITH, *Assistant Examiner.*

U.S. Cl. X.R.

324—40